3,230,472
SCAN GENERATOR FOR CW INTERFEROMETER
Emanuel A. Beck, Silver Spring, Md., assignor to the
United States of America as represented by the Secretary of the Navy
Filed Oct. 19, 1960, Ser. No. 63,707
6 Claims. (Cl. 331—38)

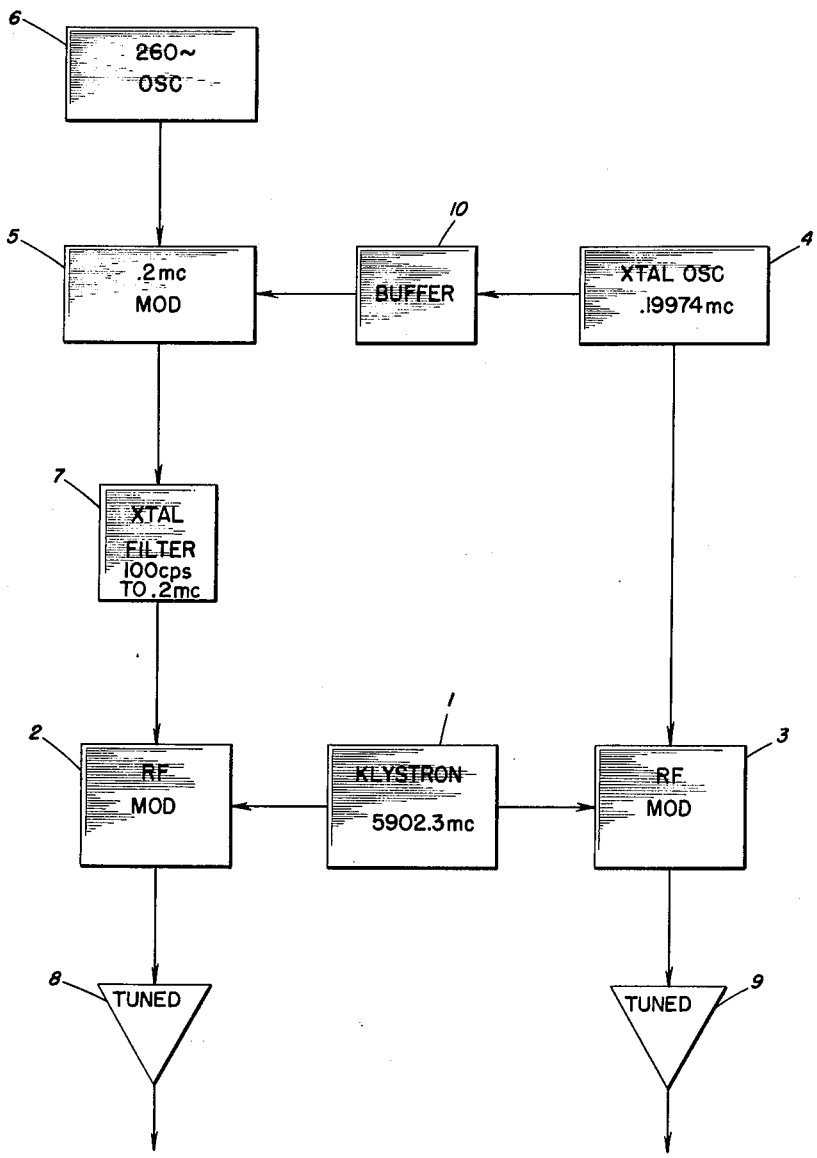

This invention relates in general to interferometer type radar systems and in particular to a novel continuous wave scan generator for producing antenna radiation scanning employing a single sideband suppressed carrier modulator.

Present systems for producing interferometer scan employ a mechanically rotated half-wave plate and crystal or ferrite modulators. These systems have proved satisfactory for many applications but when the scan frequency is increased, several serious limitations in the system present themselves. These limitation are based very largely on the mechanical aspects of the system. An increase in scan frequency requires an accompanying increase in the speed of rotation of the half-wave plate. This naturally places an upper limit upon the scan frequency for a given degree of accuracy, and at these upper frequency limits the mechanical adjustment of the plate becomes very critical and precise.

In addition to mechanical difficulties the present systems have proven unsatisfactory because they have a tendency to yield signals which are multiples of the scan rate in addition to the desired scan signal. The half-wave plate can be precisely adjusted and balanced to suppress the undesired sidebands, but it then becomes extremely narrow band and delicate. Crystals can be selected and balanced to the point where unwanted sidebands are well suppressed over a reasonable bandwidth, but this balance is destroyed by changing crystals or with changes in crystal characteristics due to aging.

The instant invention presents a system for generating interferometer scan which is entirely electrical. In addition, this novel system does not attempt to balance and cancel unwanted signals. The undesired signals can be freely generated but they are either spaced so that they will not be accepted by the receiver or are severely attenuated by filtering.

It is therefore an object of the instant invention to provide an interferometer scan generator which is entirely electrical.

Another object of the invention is to provide an interferometer scan generator which operates over a wide band of frequencies.

A further object of the invention is to provide an interferometer scan generator having a minimum of 30 db suppression of unwanted signals.

Other objects and many of the attendant advantages of this invention will be readily appreciated as the same becomes better understood by reference to the following detailed description when considered in connection with the accompanying drawing, wherein the sole figure is a schematic diagram illustrating the instant invention.

Referring to the single figure of the drawing, the output from local oscillator 1 is divided between a pair of RF amplitude modulators 2 and 3. The modulating signal is derived from crystal oscillator 4 which divides its output between RF modulator 3 and a low frequency amplitude modulator 5 whose modulating signal is derived from a conventional low frequency oscillator 6. This modulating signal is at the frequency of the desired scan. A buffer amplifier 10 is inserted between crystal oscillator 4 and amplitude modulator 5 to provide isolation and thereby prevent the undesirable reaction of a load on the oscillator 4 and feedback of the modulated signal to the crystal oscillator. The output of modulator 5 is filtered by a bandpass crystal filter 7 to eliminate all but one sideband from the output of modulator 5. The resulting filtered signal is then applied to RF modulator 2. The output of modulators 2 and 3 is applied to a pair of tuned amplifiers 8 and 9.

In describing the operation of the invention a set of operating values will be assumed by way of example. It is to be understood that these figures do not constitute limitations on the invention but merely illustrate one possible embodiment thereof. For the particular application described the scan rate desired is 260 c.p.s.

The local oscillator generates a 5902.3 mc. signal which is simultaneously applied to RF modulators 2 and 3. This signal will be respectively modulated by two modulating signals which differ in frequency by the desired scan rate of 260 c.p.s. In generating these two modulating signals, a crystal oscillator produces a 199.74 kc. signal which is applied on the one hand directly to RF modulator 3 and simultaneously to the low frequency amplitude modulator 5 where it is modulated at the scan rate of 260 c.p.s. The output signal from modulator 5 consists of a .19974 mc. carrier and two sidebands of .20000 mc./s. and .19948 mc./s. This signal is applied to the 200 kc., 100 c.p.s. bandpass crystal filter 7 which eliminates the carrier and lower sideband and applies the .20000 mc. sideband to RF modulator 2.

The RF modulator 3 modulates the 5902.3 mc. signal from local oscillator 1 with the .19974 mc. signal derived from crystal oscillator 4. The output signal from modulator 3 consists of a 5902.30000 mc. carrier and sidebands of 5902.49974 mc./s. and 5902.10026 mc./s. The RF modulator 2 modulates the 5902.3 mc. signal from local oscillator 1 with the .20000 mc. signal obtained from the filter 7. The output signal from modulator 2 will thus consist of a 5902.30000 mc. carrier and sidebands of 5902.50000 mc./s. and 5902.10000 mc./s.

The output signals from modulators 2 and 3 are applied to tuned amplifiers 8 and 9 which accept only those signals which fall within the band 5902.5 mc.±800 c.p.s. These are the 5902.50000 mc./s. and 5902.49974 mc./s. signals which differ by 260 c.p.s., thus generating the scan.

The system as described has eliminated the problems associated with mechanical scanners. There is no longer an upper limit on the scan frequency since scan generation is no longer dependent upon a rotating half-wave plate. Low frequency oscillator 6 will provide the scan rate up to all practical limits and without the necessary delicate adjustment that is required with the rotating plate.

The proposed system will not require critical adjustment of either the RF modulating components or of the modulator power supply. Thus is due primarily to the fact that, in contrast to prior systems, the proposed system is based upon the elimination of unwanted signals by attenuation and filtering rather than the balancing or cancellation of these signals. Such balancing of undesirable signals requires high component efficiency and very delicate component adjustment. Through the use of multiple single sideband suppressed carrier modulation effective attenuation and filtering of these signals is achieved.

Obviously many modifications and variations of the present invention are possible in the light of the above teachings. It is therefore to be understood that within the scope of the appended claims the invention may be practiced otherwise than as specifically described.

What is claimed is:

1. In combination, a first RF signal source, an audio oscillator for generating a scan signal, means for amplitude modulating said first RF signal at the scan rate, filter means for eliminating the carrier signal and lower sideband from said modulated RF signal so that all harmonics of the scan rate are suppressed a second RF signal source, means for modulating said second RF signal with said filtered signal, a second modulating means connected to said first and second RF signal sources for modulating said second RF signal with said first RF signal, and a pair of tuned amplifiers in the output of said first and second modulating means for selectively amplifying only the upper sideband of said modulated signals.

2. The combination as described in claim 1 wherein said means for amplitude modulating said first RF signal comprises a single sideband suppressed carrier modulator.

3. A system for generating interferometer scan, comprising an RF signal generator for generating a first RF modulating signal, a local oscillator for generating a second RF signal, means for amplitude modulating said first RF signal at a predetermined audio rate, filter means for eliminating the carrier and lower sideband from said modulated first RF signal, a pair of RF modulators, one of the RF modulators being connected to amplitude modulate said second RF signal by said unmodulated first RF signal and the other RF modulator being connected to amplitude modulate said second RF signal by said modulated first RF signal thereby producing signals in the output of the RF modulators which differ in frequency by the predetermined audio rate.

4. The system described in claim 3 wherein the output signals of the RF modulators are fed to a pair of tuned amplifiers so as to eliminate the carrier and the lower sideband therefrom.

5. The system described in claim 3 wherein said means for modulating said first RF signal comprises a single sideband suppressed carrier modulator.

6. A system for generating interferometer scan, comprising an RF signal generator for generating a first RF modulating signal, a local oscillator for generating a second RF signal of higher frequency than said first RF signal, an audio oscillator generating a scan signal, a single sideband suppressed carrier modulator connected to amplitude modulate said first RF signal at the scan rate, a pair of RF modulators, one of the RF modulators connected to amplitude modulate said second RF signal with the unmodulated first RF signal and the other RF modulator connected to amplitude modulate the second RF signal with the output signal from said single sideband suppressed carrier modulator, a pair of tuned amplifiers connected to the output of the RF modulators so that the carrier and the lower sideband is eliminated from each RF modulator output signal thereby producing in the output of the system a pair of signals which differ in frequency by the scan rate.

References Cited by the Examiner

UNITED STATES PATENTS

| 2,173,145 | 9/1939 | Wirkler | 332—45 |
| 2,852,749 | 9/1958 | Miedke | 332—45 |
| 2,935,701 | 5/1960 | Robinson et al. | 332—45 |

ROY LAKE, *Primary Examiner.*

CHESTER L. JUSTUS, KATHLEEN H. CLAFFY,
*Examiners.*

T. D. JENNINGS, J. B. MULLINS, *Assistant Examiners.*